(12) United States Patent
Sathianathan et al.

(10) Patent No.: US 6,739,830 B2
(45) Date of Patent: *May 25, 2004

(54) GAS TURBINE ENGINE BLADE CONTAINMENT ASSEMBLY

(75) Inventors: Sivasubramaniam K Sathianathan, Burton on Trent (GB); Julian M Reed, Derby (GB); Paul Hodgson, Derby (GB); David Geary, Derby (GB); Ian G Martindale, Derby (GB)

(73) Assignee: Rolls-Royce plc, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/282,007

(22) Filed: Oct. 29, 2002

(65) Prior Publication Data

US 2003/0138316 A1 Jul. 24, 2003

Related U.S. Application Data

(63) Continuation of application No. 09/814,698, filed on Mar. 23, 2001, now Pat. No. 6,543,991.

(30) Foreign Application Priority Data

Apr. 8, 2000 (GB) .............................................. 0008596

(51) Int. Cl.$^7$ ................................................ F01D 21/00
(52) U.S. Cl. ....................... 415/9; 415/173.4; 415/174.4
(58) Field of Search ........................ 415/9, 200, 173.4, 415/174.4, 173.1, 197

(56) References Cited

U.S. PATENT DOCUMENTS 6,543,991 B2 * 4/2003 Sathianathan et al. ......... 415/9

* cited by examiner

*Primary Examiner*—Edward K. Look
*Assistant Examiner*—Kimya N McCoy
(74) *Attorney, Agent, or Firm*—W. Warren Taltavull; Manelli Denison & Selter PLLC

(57) ABSTRACT

A gas turbine engine fan blade containment assembly (38) comprising a generally cylindrical, or frustoconical, metal casing (40) which has an inner surface (62), an outer surface (64), an upstream flange (42) and a downstream flange (52). The outer surface (62) of the metal casing (40) is provided with a pattern of blind apertures (66) which extend radially inwardly from the outer surface (62) of the metal casing (40) between the flanges (42,52). The fan blade containment has reduced weight of the metal casing (40) of the fan blade containment assembly (38) for a large diameter turbofan gas turbine engine (10) but has unimpaired stiffness and penetration resistance.

25 Claims, 4 Drawing Sheets

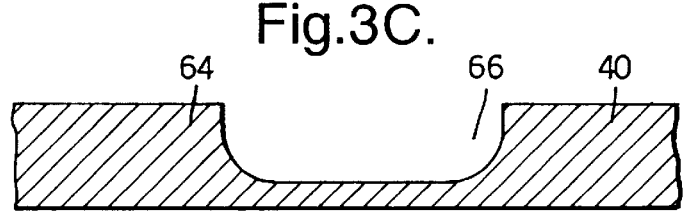
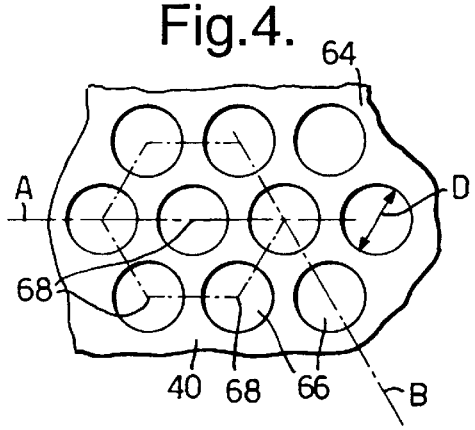
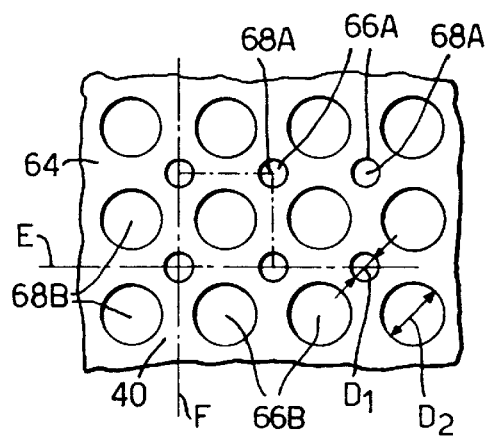

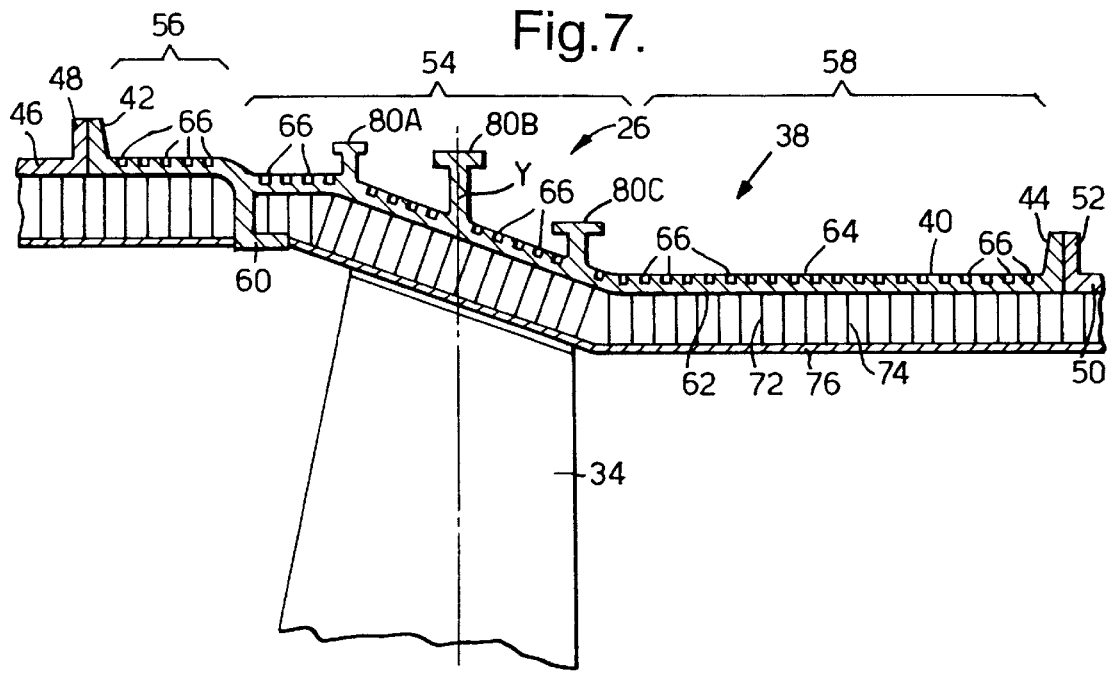
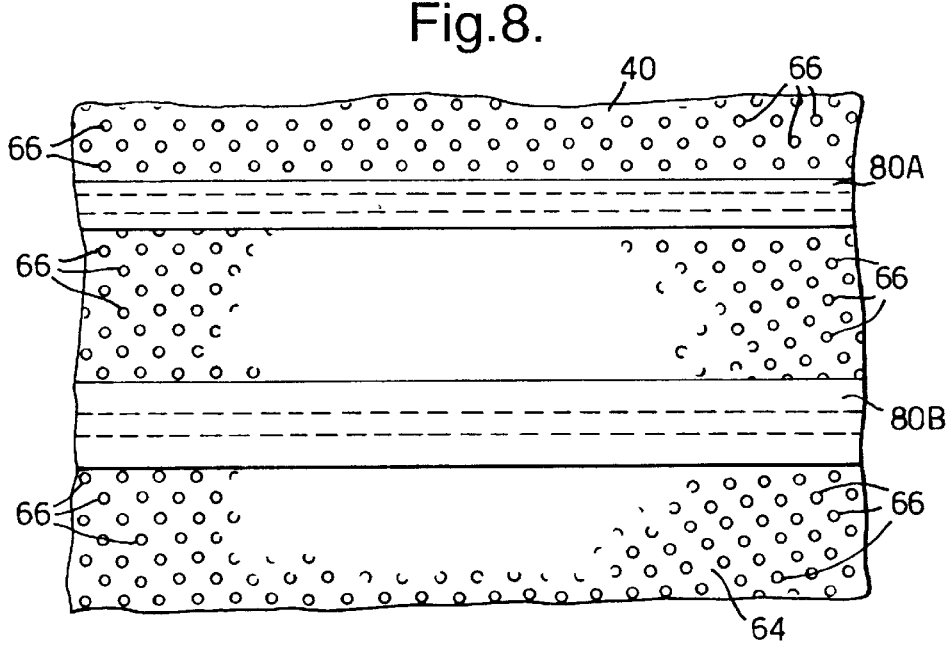

GAS TURBINE ENGINE BLADE CONTAINMENT ASSEMBLY

This is a continuation of National Application Ser. No. 09/814,698 filed Mar. 23, 2001, now U.S. Pat. No. 6,543,991.

The present invention relates to gas turbine engine casings, particularly gas turbine engine fan casings, more particularly to an improved blade containment assembly for use within or forming a part of the gas turbine engine casing.

Turbofan gas turbine engines for powering aircraft conventionally comprise a core engine, which drives a fan. The fan comprises a number of radially extending fan blades mounted on a fan rotor which is enclosed by a generally cylindrical fan casing. The core engine comprises one or more turbines, each one of which comprises a number of radially extending turbine blades enclosed by a cylindrical, or frustoconical, casing.

There is a remote possibility that with such engines that part, or all, of a fan blade, or a turbine blade, could become detached from the remainder of the fan or turbine. In the case of a fan blade becoming detached this may occur as the result of, for example, the turbofan gas turbine engine ingesting a bird or other foreign object.

The use of containment rings for turbofan gas turbine engine casings is well known. It is known to provide generally cylindrical, or frustoconical, relatively thick metallic containment rings. It is also known to provide generally cylindrical, or frustoconical, locally thickened, isogrid, metallic containment rings. Furthermore it is known to provide strong fibrous material wound around relatively thin metallic casings or around the above mentioned containment casings. In the event that a blade becomes detached it passes through the casing and is contained by the fibrous material.

However, the relatively thick containment casings are relatively heavy, the relatively thin casings enclosed by the fibrous material are lighter but are more expensive to manufacture. The relatively thick casings with fibrous material are both heavier and more expensive to manufacture.

Accordingly the present invention seeks to provide a novel gas turbine engine casing which overcomes the above mentioned problems.

Accordingly the present invention provides a gas turbine engine rotor blade containment assembly comprising a generally cylindrical, or frustoconical, metal casing, to contain a gas turbine engine rotor blade in a gas turbine engine rotor blade containment region, the metal casing having an inner surface and an outer surface, at least a portion of at least one of the inner surface, or the outer surface, of the metal casing having a plurality of blind apertures extending into the casing from the surface of the casing to reduce the weight of the casing without impairing the stiffness and penetration resistance of the metal casing.

Preferably the at least one portion is at least a part circumferential portion or at least a part axial portion.

Preferably the at least one portion extends completely circumferentially around the metal casing.

Preferably the metal casing has a flange at an upstream end of the metal casing and a flange at the downstream end of the metal casing.

Preferably the at least one portion is a portion of the outer surface of the metal casing between the, flanges at the upstream end and downstream end of the metal casing.

The metal casing may have at least one circumferentially extending rib extending radially outwardly from the metal casing axially between the flanges, the at least one portion of the outer surface of the metal casing is between one of the flanges and the at least one rib or between adjacent ribs. The rib may have a T-shaped cross-section.

Preferably the whole of the outer surface of the metal casing has a plurality of blind apertures.

Alternatively the whole of the inner surface of the metal casing has a plurality of blind apertures.

Preferably at least one portion of the inner surface, or the outer surface, of the metal casing comprises a predetermined pattern of blind apertures.

There may be a first set of blind apertures having a first diameter, a second set of blind apertures having a second diameter and the second diameter is greater than the first diameter. There may be a third set of blind apertures having a third diameter and the third diameter is greater than the second diameter.

Preferably the blind apertures are circular in cross-section.

The blind apertures may be flat bottomed cylindrical blind apertures, part spherical blind apertures or other suitably shaped blind apertures.

Preferably the plurality of blind apertures are arranged in an asymmetrical pattern.

One or more continuous layers of a strong fibrous material are wound around the metal casing.

The metal casing may comprise aluminium, an aluminium alloy, magnesium, a magnesium alloy, titanium, a titanium alloy, nickel, a nickel alloy or preferably from a steel alloy.

An acoustic lining may be provided within the metal casing.

The containment casing may be a fan containment casing, a compressor containment casing or a turbine containment casing.

The present invention will be more fully described by way of example with reference to the accompanying drawings in which:

FIGS. 3A to 3C are alternative enlarged cross-sectional views through a portion of the fan casing of the fan blade containment assembly shown in FIG. 2.

FIG. 4 is an enlarged plan view of part of the fan casing shown in FIG. 2.

FIG. 5 is an alternative enlarged plan view of part of the fan casing shown in FIG. 2.

FIG. 7 is an enlarged view of an alternative fan blade containment assembly shown in FIG. 1.

FIG. 8 is an enlarged plan view of part of the fan casing shown in FIG. 7.

Figure 1:
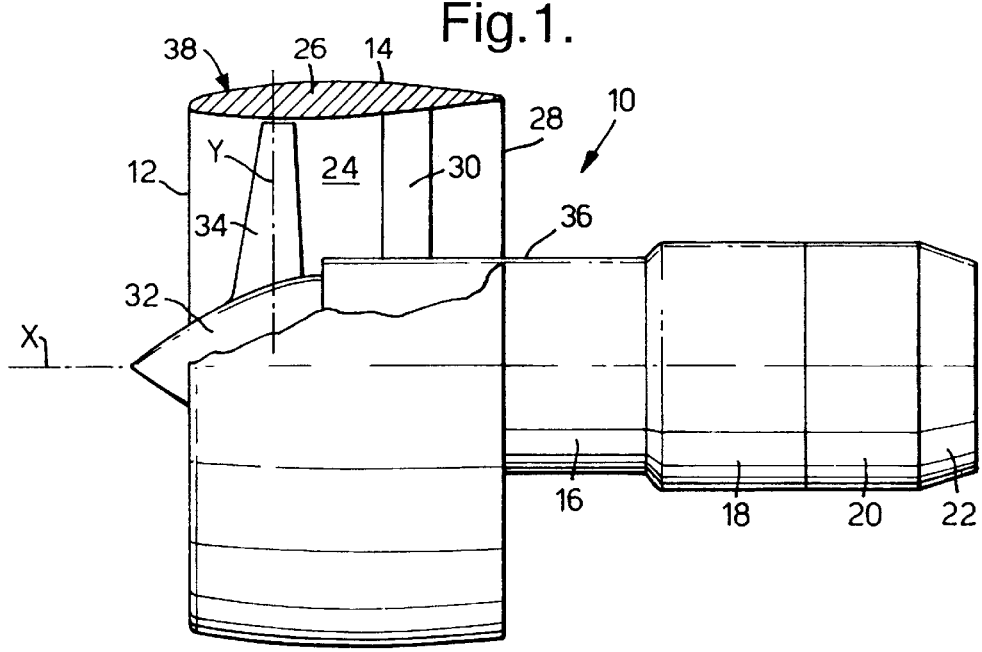
FIG. 1 is a partially cut away view of a gas turbine engine having a fan blade containment assembly according to the present invention.

A turbofan gas turbine engine 10, as shown in FIG. 1, comprises in flow series an intake 12, a fan section 14, a compressor section 16, a combustor section 18, a turbine section 20 and an exhaust 22. The turbine section 20 comprises one or more turbines arranged to drive one or more compressors in the compressor section 16 via shafts. The turbine section 20 also comprises a turbine to drive the fan section 14 via a shaft. The fan section 14 comprises a fan duct 24 defined partially by a fan casing 26. The fan duct 24 has an outlet 28 at its axially downstream end. The fan casing 26 is secured to the core engine casing 36 by a plurality of radially extending fan outlet guide vanes 30. The fan casing surrounds a fan rotor 32, which carries a plurality of circumferentially spaced radially extending fan blades 34. The fan rotor 32 and fan blades 34 rotate about the axis X of the gas turbine engine 10, substantially in a plane Y perpendicular to the axis X. The fan casing 26 also comprises a fan blade containment assembly 38, which is arranged substantially in the plane of the fan blades 34.

Figure 2:
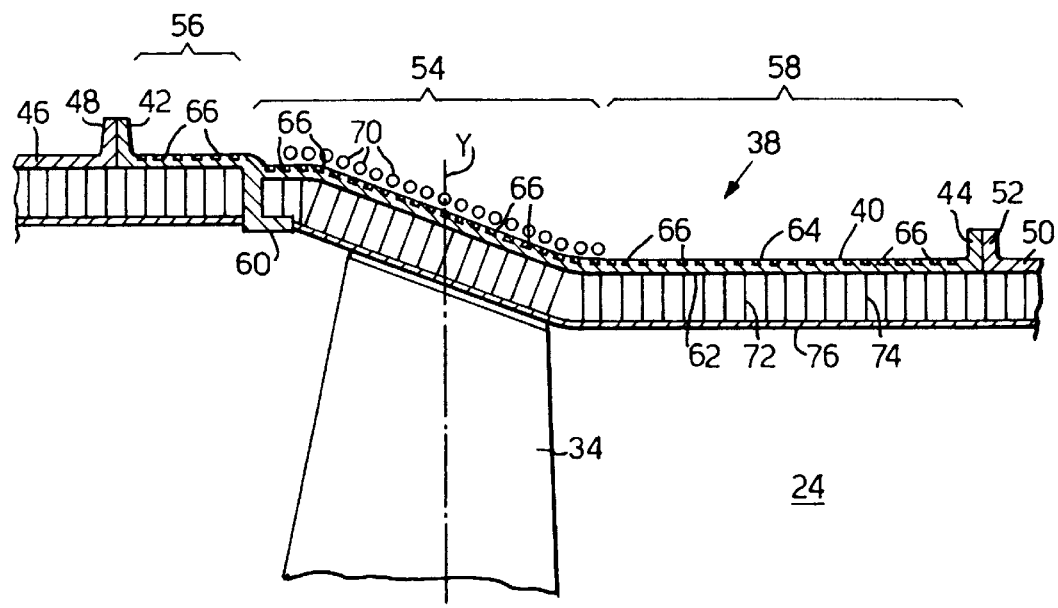
FIG. 2 is an enlarged view of the fan blade containment assembly shown in FIG. 1.

The fan casing 26 and fan blade containment assembly 38 is shown more clearly in FIG. 2. The fan blade containment assembly 38 comprises a metal cylindrical, or frustoconical, casing 40. The metal casing 40 comprises an upstream flange 42 by which the fan blade containment assembly 38 is connected to a flange 48 on an intake assembly 46 of the fan casing 26. The metal casing 40 also comprises a downstream flange 44 by which the fan blade containment assembly 38 is connected to a flange 52 on a rear portion 50 of the fan casing 26.

The metal casing 40 provides the basic fan blade containment and provides a connection between the intake casing 46 and the rear casing 50.

The metal casing 40 comprises an upstream portion 56, a main blade containment portion 54 and a downstream portion 58. The upstream portion comprises the flange 42 and the downstream portion 58 comprises the flange 52.

The upstream portion 56 is upstream of the plane Y of the fan blades 34 and provides debris protection for the fan blade containment assembly 38. The main blade containment portion 54 is substantially in the plane Y containing the fan blades 34 and comprises a radially inwardly and axially downstream extending flange, or hook, 60 at its upstream end. The downstream portion 58 is downstream of the plane Y of the fan blades 34, and provides protection for where a root of a fan blade 34 impacts the fan blade containment assembly 38.

The metal casing 40 has an inner surface 62 and an outer surface 64 and the whole of the outer surface 64 between the flanges 42 and 44 is provided with a plurality of blind apertures 66. The blind apertures 66 extend substantially perpendicularly into the metal casing 40 from the outer surface 64 of the metal casting 40.

The blind apertures 66 have a circular cross-section and may be either cylindrical and flat bottomed, as shown in FIG. 3A, part spherical, as shown in FIG. 3B, or other suitable shape, as shown in FIG. 3C.

In one arrangement of blind apertures 66, as shown in FIG. 4, the blind apertures 66 have the same diameter D and the blind apertures 66 are arranged in a symmetrical pattern. Six blind apertures 66 are positioned at the corners of a regular hexagon and one blind aperture 66 positioned at the centre of the regular hexagon equidistant from the other six blind apertures 66 at the corners of the regular hexagon. The centres 68 of the blind apertures 66 are arranged in planes A substantially perpendicular to the axis X of the gas turbine engine 10 and in planes B substantially at 60° to planes perpendicular to the axis X of the gas turbine engine 10.

In another arrangement of blind apertures 66, as shown in FIG. 5, a first set of blind apertures 66A have a first diameter $D_1$ and a second set of blind apertures 66B have a second diameter $D_2$. The diameter $D_2$ is greater than the diameter $D_1$. The blind apertures 66A and 66B are also arranged in a symmetrical pattern with four blind apertures 66A positioned at a corner of a square and one blind aperture 66B positioned at the centre of the square equidistant from the four blind apertures 66A at the corners of the square. The centres 68A and 68B of the blind apertures 66A and 66B respectively are arranged in planes E substantially perpendicular to the axis X of the gas turbine engine 10 and in planes F substantially containing the axis X of the gas turbine engine 10.

Figure 6:
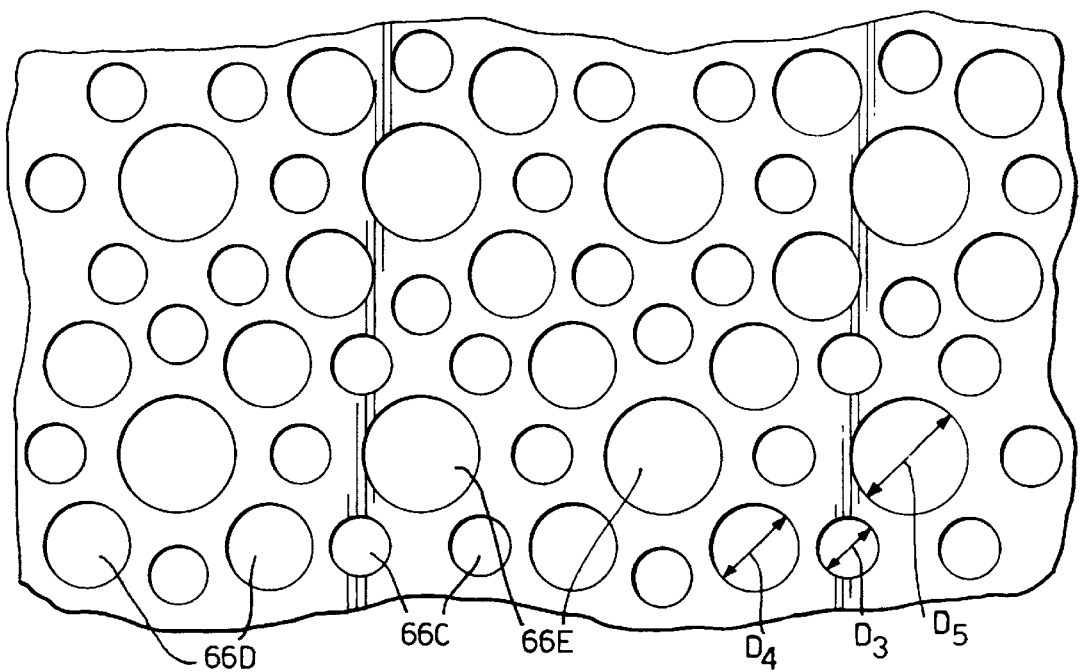
FIG. 6 is a further enlarged plan view of part of the fan casing shown in FIG. 2.

In a further arrangement of blind apertures 66, as shown in figure 6, a first set of blind apertures 66C have a first diameter D3, a second set of blind apertures 66D have a second diameter D4 and a third set of apertures 66E have a diameter D5. The diameter D4 is greater than the diameter D3 and the diameter D5 is greater than the diameter D4. The blind apertures 66C, 66D and 66E are arranged in a non-symmetrical pattern.

It may be possible to use other arrangements of blind apertures with four, or more, sets of blind apertures, each set of blind apertures having a different diameter.

It may be desirable in some circumstances to provide a number of continuous layers of a strong fibrous material 70 wound around the metal casing 40 to further increase the energy absorbing capability of the fan blade containment assembly 38. The strong fibrous material 70 may for example be woven aromatic polyamide fibres known as KEVLAR (KEVLAR is a registered trademark of Dupont Ltd). There may also be a number of layers of discrete pieces of flexible material woven from KEVLAR between the metal casing 40 and the continuous layers of fibrous material 70.

An acoustic lining may be provided on the inner surface of the first metal casing 40. The acoustic lining 72 comprises a honeycomb 74 and a perforate sheet 76. The honeycomb 74 and perforate sheet 76 are quite conventional. Other types of acoustic lining may be provided.

Another fan blade containment assembly 38A, as shown in FIG. 7 and 8, is substantially the same as that shown in FIG. 2. It differs in that the main blade containment portion 54 also comprises at least one radially outwardly extending integral rib 80A, 80B, 80C, which extends completely circumferentially around the metal casing 40 to stiffen the metal casing 40 to improve the blade containment characteristics of the fan blade containment assembly 34. Each of the ribs 80A, 80B, 80C, are described more fully in our published European patent application EP 0965731 A2. The blind apertures 66 are provided axially between the ribs and axially between one of the ribs and one of the flanges 42 and 44.

A further difference between the embodiments in FIGS. 2 and 7 is that the thickness of the metal casing 40 in FIG. 2 is greater than the thickness of the metal casing in FIG. 7. This is because the embodiments in FIG. 7 have the stiffening ribs which increase the stiffness of the metal casing 40 allowing the thickness of the metal casing between the ribs and flanges to be minimised.

The depth of the blind apertures is up to 80% of the thickness of the metal casing and the diameter of the blind apertures is up to three times the thickness of the metal casing.

For example the thickness of the metal casing 40 in FIG. 7, for a steel casing, is in the range 3.2 to 5.2 mm in the main blade containment portion 54. In this example the depth of the blind apertures is in the range 2.4 to 4 mm and the diameter of the blind apertures is up to 9 to 15 mm.

Any suitable symmetrical or asymmetrical pattern of blind holes may be used, however it is preferred that an asymmetrical pattern is used to minimise the risk of cracking of the metal casing in the event of a fan blade impact. The asymmetrical pattern includes blind apertures with different diameters and different distances between the blind apertures. The asymmetrical pattern minimises the probability of cracking of the metal casing. Any suitable diameter of the blind aperture may be used. However, it is preferred that the diameter of the largest blind aperture is smaller than the two smallest dimensions of any sharp fragment of the fan blade, or other object, impacting the metal casing to prevent penetration of the fragment of the fan blade through the metal casing. The diameter of the largest blind aperture may allow partial penetration of a fragment of a fan blade, or other object, but not complete penetration of the fragment of the fan blade through the metal casing.

The blind apertures 66 are formed in the metal casing 40 by computer numerically controlled (CNC) machining operations, for example using suitably shaped end-milling tools or ball nosed cutting tools.

In operation of the gas turbine engine 10, in the event that a fan blade 34, or a portion of a fan blade 34, becomes detached it encounters the metal casing 40. The metal casing 40 is impacted by the fan blade 34, or portion of the fan blade 34, and effectively removes energy from the fan blade 34, or portion of the fan blade 34.

The fan blade containment assembly of the present invention has several advantages.

The metal casing is significantly lighter than conventional fan blade containment assemblies, especially on relatively large diameter turbofan gas turbine engines. The provision of the blind apertures reduces the weight of the metal casing without impairing the stiffness and penetration resistance of the metal casing.

The metal casing may be manufactured from a metal for example aluminium, an aluminium alloy, magnesium, a magnesium alloy, titanium, a titanium alloy, nickel, a nickel alloy or preferably from a steel alloy.

The invention has been described with reference to a fan blade containment assembly, however it is equally applicable to a compressor blade containment assembly and a turbine blade containment assembly.

We claim:

1. A gas turbine engine rotor blade containment assembly comprising a generally cylindrical, or frustoconical, metal casing, to contain a gas turbine engine rotor blade in a gas turbine engine rotor blade containment region, the metal casing having an inner surface and an outer surface, the outer surface of the metal casing extending axially between flanges and being cylindrical, or frustoconical, the metal casing having a flange at an upstream end of the metal casing and a flange at a downstream end the of the metal casing, the flanges extending radially outwardly from the outer surface of the metal casing, at least a portion of the outer surface of the metal casing between the flanges at the upstream end and the downstream end of the metal casing having a plurality of blind apertures extending into the casing from the outer surface of the metal casing to reduce the weight of the metal casing without impairing the stiffness and penetration resistance of the metal casing.

2. A gas turbine engine rotor blade containment assembly as claimed in claim 1 wherein the at least one portion is at least a part circumferential portion or at least a part axial portion.

3. A gas turbine engine rotor blade containment assembly as claimed in claim 1 wherein the at least one portion extends completely circumferentially around the metal casing.

4. A gas turbine engine rotor blade containment assembly as claimed in claim 1 wherein the metal casing has a flange at an upstream end of the metal casing and a flange at the downstream end of the metal casing.

5. A gas turbine engine rotor blade containment assembly as claimed in claim 4 wherein the at least one portion is a portion of the outer surface of the metal casing between the flanges at the upstream end and downstream end of the metal casing.

6. A gas turbine engine rotor blade containment assembly as claimed in claim 5 wherein the metal casing has at least one circumferentially extending rib extending radially outwardly from the metal casing axially between the flanges, the at least one portion of the outer surface of the metal casing is between one of the flanges and the at least one circumferentially extending rib.

7. A gas turbine engine rotor blade containment assembly as claimed in claim 5 wherein the metal casing has at least two circumferentially extending ribs extending radially outwardly from the metal casing axially between the flanges, the at least one portion of the outer surface of the metal casing is between the two circumferentially extending ribs.

8. A gas turbine engine rotor blade containment assembly as claimed in claim 6 or claim 7 wherein the rib has a T-shaped cross-section.

9. A gas turbine engine rotor blade containment assembly as claimed in claim 1 wherein the whole of the outer surface of the metal casing has a plurality of blind apertures.

10. A gas turbine engine rotor blade containment assembly as claimed in claim 1 wherein the at least one portion of the outer surface of the metal casing comprises a predetermined pattern of blind apertures.

11. A gas turbine engine rotor blade containment assembly as claimed in claim 10 wherein the blind apertures are arranged at the corners and the centre of a hexagon.

12. A gas turbine engine rotor blade containment assembly as claimed in claim 1 wherein the blind apertures are circular in cross-section.

13. A gas turbine engine rotor blade containment assembly as claimed in claim 12 wherein the blind apertures are flat bottomed cylindrical blind apertures or part spherical blind apertures.

14. A gas turbine engine rotor blade containment assembly as claimed in claim 12 wherein the diameter of the blind apertures is up to 3 times the thickness of the metal casing.

15. A gas turbine engine rotor blade containment assembly as claimed in claim 1 wherein the depth of the blind apertures is up to 80% of the thickness of the metal casing.

16. A gas turbine engine rotor blade containment assembly as claimed in claim 1 wherein the plurality of blind apertures are arranged in an asymmetrical pattern.

17. A gas turbine engine rotor blade containment assembly as claimed in claim 1 wherein at least one continuous layer of a strong fibrous material is wound around the metal casing.

18. A gas turbine engine rotor blade containment assembly as claimed in claim 1 wherein the metal casing is selected from the group comprising aluminium, an aluminium alloy, magnesium, a magnesium alloy, titanium, a titanium alloy, nickel, a nickel alloy and a steel alloy.

19. A gas turbine engine rotor blade containment assembly as claimed in claim 1 wherein an acoustic lining is provided within the metal casing.

20. A gas turbine engine rotor blade containment assembly as claimed in claim 1 wherein the containment casing is a fan containment casing, a compressor containment casing or a turbine containment casing.

21. A gas turbine engine rotor blade containment assembly as claimed in claim 1 wherein the whole of the inner surface of the metal casing has a plurality of blind apertures.

22. A gas turbine engine rotor blade containment assembly comprising a generally cylindrical, or frustoconical metal casing to contain a gas turbine rotor blade in a gas turbine engine rotor blade containment region, the metal casing having an inner surface and an outer surface, at least a portion of the inner surface of the metal casing having a plurality of blind apertures extending into the casing from the surface of the casing to reduce the weight of the casing without impairing the stiffness and penetration resistance of the metal casing.

23. A gas turbine engine rotor blade containment assembly comprising a generally cylindrical, or frustoconical, metal casing to contain a gas turbine engine rotor blade in a gas turbine engine rotor blade containment region, the metal casing having an inner surface and an outer surface, the metal casing having a flange at an upstream end of the metal casing and a flange at a downstream end of the metal casing, the flanges extending radially outwardly from the outer surface of the metal casing, the metal casing having at least one circumferentially extending rib extending radially outwardly from the outer surface of the metal casing axially between the flanges, the outer surface of the metal casing extending axially between one of the flanges at the upstream end and the downstream end of the metal casing and the at least one circumferentially extending rib being cylindrical, at least a portion of the outer surface of the metal casing between one of the flanges at the upstream end and the downstream end of the metal casing and the at least one circumferentially extending rib having a plurality of blind apertures extending into the metal casing from the outer surface of the metal casing to reduce the weight of the metal casing without impairing the stiffness and penetration resistance of the metal casing.

24. A gas turbine engine rotor blade containment assembly as claimed in claim 23 wherein the metal casing has at least two circumferentially extending ribs extending radially outwardly from the outer surface of the metal casing, at least a portion of the outer surface of the metal casing between the two circumferentially extending ribs having a plurality of blind apertures extending into the metal casing from the outer surface of the metal casing to reduce the weight of the metal casing without impairing the stiffness and penetration resistance of the metal casing.

25. A gas turbine engine rotor blade containment assembly comprising a generally cylindrical or frustoconical, metal casing to contain a gas turbine engine rotor blade in a gas turbine engine rotor blade containment region, the metal casing having an inner surface and an outer surface, the outer surface of the metal casing extending axially and being cylindrical, or frustoconical, the metal casing having at least two circumferentially extending ribs extending radially outwardly from the outer surface of the metal casing, at least a portion of the outer surface of the metal casing between the two circumferentially extending ribs having a plurality of blind apertures extending into the metal casing from the outer surface of the metal casing to reduce the weight of the metal casing without impairing the stiffness and penetration resistance of the metal casing.

* * * * *